US007665035B2

(12) United States Patent
Burnett

(10) Patent No.: US 7,665,035 B2
(45) Date of Patent: Feb. 16, 2010

(54) CONTENT SELECTION APPARATUS, SYSTEM, AND METHOD

(75) Inventor: Robert J. Burnett, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 356 days.

(21) Appl. No.: 10/151,522

(22) Filed: May 20, 2002

(65) Prior Publication Data

US 2003/0224759 A1 Dec. 4, 2003

(51) Int. Cl.
*G06F 3/00* (2006.01)
(52) U.S. Cl. .................. 715/789; 715/708; 715/745; 715/811; 715/704; 715/744
(58) Field of Classification Search ............ 715/700, 715/708, 745, 789, 811, 704, 744; 725/135, 725/136; 428/694
See application file for complete search history.

(56) References Cited

U.S. PATENT DOCUMENTS

| | | | |
|---|---|---|---|
| 5,945,988 A | 8/1999 | Williams et al. | |
| 6,100,811 A | 8/2000 | Hsu et al. | |
| 6,112,063 A | 8/2000 | Ravi et al. | |
| 6,212,555 B1 | 4/2001 | Brooks, Jr. et al. | |
| 6,282,412 B1 | 8/2001 | Lyons | |
| 6,314,094 B1 | 11/2001 | Boys | |
| 6,418,424 B1 * | 7/2002 | Hoffberg et al. | 706/21 |
| 6,640,145 B2 * | 10/2003 | Hoffberg et al. | 700/83 |
| 6,678,215 B1 * | 1/2004 | Treyz et al. | 368/10 |
| 6,704,553 B1 | 3/2004 | Eubanks | |
| 2002/0144259 A1 * | 10/2002 | Gutta et al. | 725/10 |
| 2003/0105589 A1 * | 6/2003 | Liu et al. | 702/1 |
| 2003/0182316 A1 * | 9/2003 | Johnson | 707/200 |
| 2004/0096704 A1 * | 5/2004 | Murase et al. | 428/694 ML |
| 2004/0139480 A1 * | 7/2004 | Delpuch et al. | 725/135 |
| 2006/0140590 A1 * | 6/2006 | Murase et al. | 386/96 |
| 2007/0256021 A1 * | 11/2007 | Prager et al. | 715/744 |

OTHER PUBLICATIONS

Engenius, "Vehicle Communications," http://www.engenius.com/products/vehiclenet.asp, retrieved Dec. 10, 2001.
ACCUTest, "Flight Recorder," http://www.accutest.co.uk/flight-recorder.htm, retrieved Dec. 10, 2001.
D-Link "D-Link DSB-R100 PC FM USB Radio," http://www.dlink.com/products/usb/dsbr_100/, retrieved Nov. 13, 2001.

(Continued)

*Primary Examiner*—Weilun Lo
*Assistant Examiner*—Mylinh Tran
(74) *Attorney, Agent, or Firm*—Pearne & Gordon LLP

(57) ABSTRACT

A media presentation apparatus includes a user preference storage module to store a user preference associated with a user activity and a content selection, coupled to a content selection module to select a content offering based on the user preference. A system includes a media presentation apparatus coupled to a preference manipulation apparatus. A method of processing user preferences includes storing a user preference associated with a user activity and a content selection, and selecting a content offering based on the user preference. The content offering can be selected from a plurality of offerings, based on a combination of user preferences.

23 Claims, 3 Drawing Sheets

OTHER PUBLICATIONS

ChipCenter Questlink, "CANbus Datalogger," http://www.chipcenter...cuitcellar/november01/c1101npn1.htm, retrieved Nov. 27, 2001.

Microsoft, "Under One Roof, Concept Home Brings Together Technologies for Better Living," http://www.microsoft.com/P...ass/press/2600/Jan00/HomeDebutCESpr.as, Jan. 6, 2000.

CNET, "Accenture, Microsoft carpool on auto gadgets," http://dailynews.yahoo.com/h/cn/2002.../accenture_microsoft_carpool_on_auto_gadets_1.htm, Jan. 10, 2002.

EnGenius, "Digital I/O Expansion," Oct. 7, 1999.

EnGenius, "MobilCom III/s," Oct. 7, 1999.

* cited by examiner

CONTENT SELECTION APPARATUS, SYSTEM, AND METHOD

TECHNICAL FIELD

Embodiments of the present invention relate generally to apparatus, systems, and methods used for selecting and presenting media content to a user. More particularly, embodiments of the present invention relate to automated selection of media content for presentation to a user based on one or more user preferences.

BACKGROUND INFORMATION

As consumers of media content search for greater convenience, fidelity, and reliability, several media presentation devices have come into popular use. These include various forms of mobile audio and video media presentation devices, such as the mobile radio satellite receiver, personal video recorder (PVR), and the digital audio player.

The availability of media in streaming digital format provides an improved playback experience; live content can be paused, commercials can be skipped, and repeated recording does nothing to degrade the quality of the recorded content. In addition, a practically unlimited variety of such content is typically available to users in their cars (e.g., satellite radio receivers), at their desk (e.g., via the internet, with streaming video and audio programs), and on-the-run (e.g., the MP3 player).

While the benefits of increased content variety are substantial, currently available presentation devices do not provide the capability to extract, retain, and utilize user preferences with respect to various forms of media content. Thus, the increasing number of content sources may cause users to spend a considerable amount of time locating preferred content. The extended selection process may also result in distraction, interfering with the execution of other duties, such as driving. Further, the myriad choices can overwhelm the user, resulting in frustration and disenchantment with certain media providers. Therefore, there is a need in the art for an apparatus, an article including a machine-accessible medium, a system, and a method of conveniently accessing media in various formats according to previously-expressed user preferences.

SUMMARY OF THE EMBODIMENTS

In one embodiment, the invention can be described as a media content presentation apparatus having a user preference storage module coupled to a content selection module. The apparatus may be included as part of a personal video player, a CD-ROM player, a mobile satellite radio, a television, and the like.

The user preference storage module is used to store user preferences associated with user-selected content. Such preferences can be measurable parts of, embedded in, or broadcast with the associated content, and may include such items as the genre, author, performer, recording company, media type, rating, and publication date. Other modules, such as a user preference acquisition module and content reception module, can be coupled to various elements of the presentation apparatus.

User activity determines which preferences will be stored. Such activity includes, for example, listening to an entire song, watching less than one minute of a video play, or turning up the volume of a particular music video production. Thus user activity can be positive, indicating desirable content, or negative, indicating undesirable content.

The content selection module is used to select content offerings based on acquired and/or stored user preferences. Thus, for example, if a user enters a city that has various radio stations offering many different selections, the content selection module is used to automatically select only classical music written by a particular composer, or primarily music videos of poetry readings, all in accordance with prior preferences expressed by the user.

In another embodiment, user preferences can be transmitted to a user preference manipulation apparatus, which permits the display and entry of user preferences, as well as deletion and modification. Preferences can also be stored in a removable, portable storage device which couples to both the presentation apparatus and the manipulation apparatus. Alternatively, the preferences can be sent to the manipulation apparatus from the storage module using wireless mechanism, or a wired network.

In yet another embodiment, the invention can be described as a method of processing user preferences, or an article comprising a medium with data capable of causing a machine to engage in activities such as: monitoring user activity, acquiring user preferences associated with user activity and content selections, storing user preferences, and selecting content offerings based on the acquired/stored preferences. The method and activities directed by the article can also include rejecting content based on the acquired and/or stored user preferences.

DETAILED DESCRIPTION OF THE EMBODIMENTS

Figure 1:
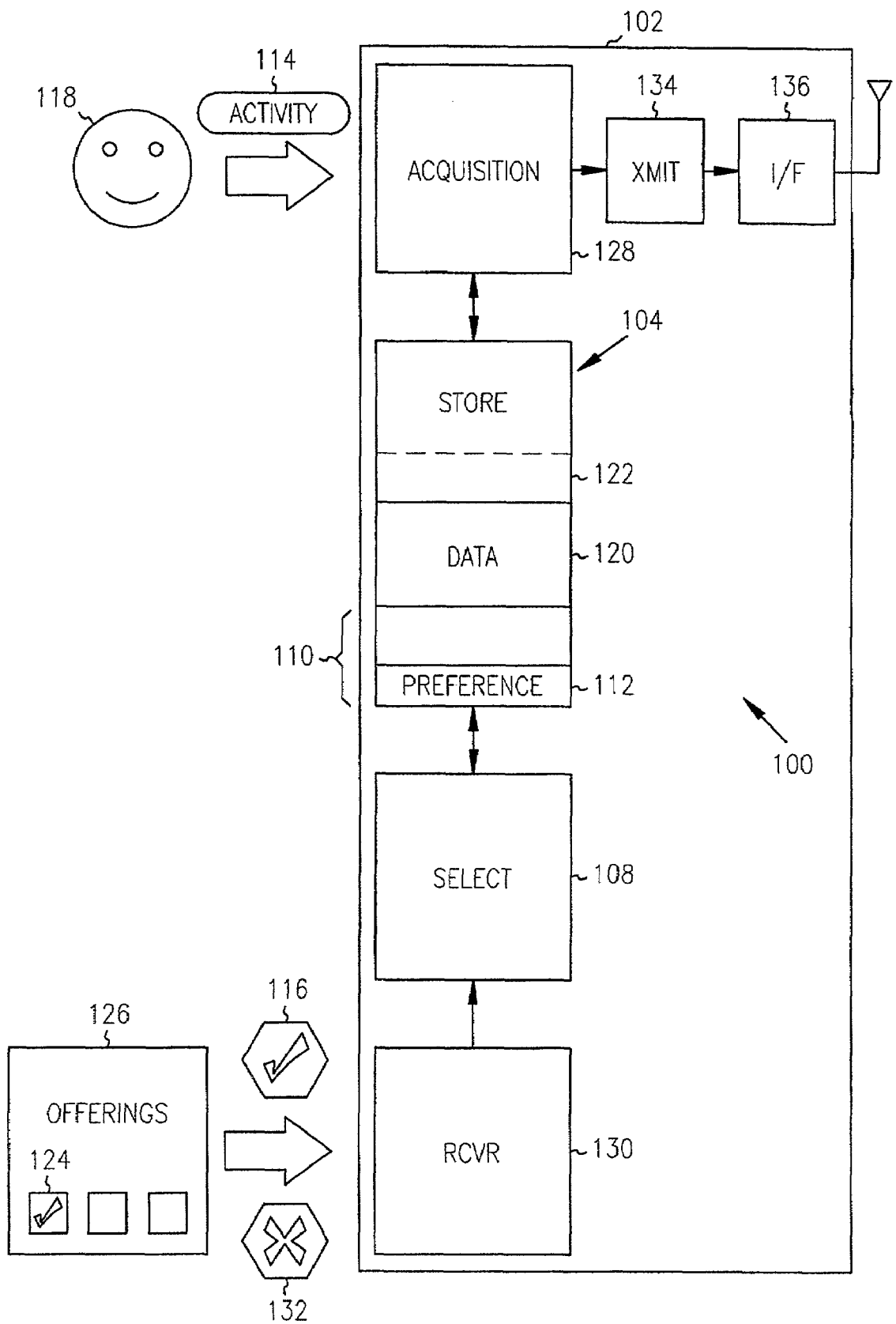
FIG. 1 is a block diagram of a media presentation apparatus according to an embodiment of the present invention.

In the following detailed description of various embodiments of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

FIG. 1 is a block diagram of a media presentation apparatus according to an embodiment of the present invention. The apparatus 100 includes a user preference storage module 104 which can be coupled to a content selection module 108. The apparatus 100 can be included as part of any number of currently-available media recording and/or playback devices 102, as well as those to be developed in the future. For example, the apparatus 100 can be included as part of a mobile satellite radio receiver, a personal video recorder (PVR), a television receiver, a digital video disk (DVD) player, a video cassette recorder (VCR), an MP3 player 102, etc.

The user preference storage module 104 is used to store a plurality of user preferences 110, including a user preference 112 associated with a user activity 114 and a content selection 116. The user preferences 110, 112 can be stored in a formatted database 120, if desired. The user preferences 110, 112 can also be stored on some form of removable media 122, such as a memory stick, compact disc, read-only memory (CD-ROM), or other memory.

For the purposes of this document, user preferences are defined as any characteristic of a particular content selection which can be classified, measured, or recorded, including but not limited to: a genre, an author, a performer, a company, a media type, a rating, a publication date, a retail sales price, and a playback time. It should be noted that such preferences tend to be relatively permanent, in that a group of preferences associated with a particular content selection will always result in choosing (at least) the associated content from among several content offerings.

Of course, different media types can be associated with similar preferences, as well as preference from obviously different categories. For example, a taped reading of a book can be associated with any of the above listed preferences, and further, more particular indications of the content type, such as art, biography, comedy, etc. On the other hand, a play can be associated with user preferences such as a recording studio, a performing group name, a performance language, and whether the performance was recorded in color or black and white.

Thus, when a user 118 engages in some activity 114 related to some selected content 116, one or more user preferences 112 can be stored (along with other previously-expressed preferences) in the user preference storage module 104 for future use. Such use includes, for example, operating the content selection module 108 to select a content offering 124 from among a plurality of content offerings 126, based on the stored user preference 112. It should be noted that the selected content 116 can be explicitly selected by the user 118, or automatically selected by the apparatus and methods described herein. Some examples of typical user 118 interaction with the apparatus 100 follow.

In a first example, the user 118 acts to scan through a multiplicity of songs recorded on a compact disk (CD), using a CD-player having the apparatus 100 embedded as part of its architecture. The CD is then considered as the source of the content offerings 126. Each song on the CD will have various preferences associated with it. Some preferences, such as the recording studio, will likely be the same. Other preferences, such as the playback time, will likely be different.

As the user 118 scans through the selections, he plays some songs on the CD for a short while (e.g. a song scanning interval), skip others, and then listen to entire tracks whenever a favorite recording is encountered. Those skilled in the art will realize, therefore, that some user activities 114, such as turning up the volume well past the normal listening level, or refraining from changing to another track on the CD until after a particular song has ended, can be considered as positive indications by the user 118 that the selected content 116 includes some desired characteristic. When such positive indications are noted, as defined by the user 118, or some other entity, the preferences associated with the activity 114 are stored in the storage module 104. Similarly, negative indications may serve to indicate undesirable content (to be rejected in the future by the selection module 108). Such negative indications, which may also cause user preferences derived from them to be recorded in the storage module 104, include: viewing or listening to a content selection for a very short time (e.g. less than 20 seconds), skipping a selection completely when selections are offered in a sequential format (e.g. songs on a CD), or viewing titles of various content, and failing to select any particular content from available offerings (e.g. scanning through a listing of available satellite television offerings without viewing the actual content). Thus, for the purposes of this document, activities are defined as any action on the part of a user which can be monitored by the apparatus 100 during the presentation of selected content to the user.

Each user preference can be acquired by way of a user preference acquisition module 128, which can take the form of a keypad memory, a volume control monitor, etc. The user preference acquisition module 128 is typically designed to change analog signal levels to digital levels, or to otherwise convert monitored user activities 114 into appropriate indications which assist in making a determination as to whether particular preferences 112 will be stored in the user preference storage module 104. An example of such operation might be monitoring playback times for music selections, and triggered storage of all preferences 110 associated with any selections 116 which exceed three minutes of playback time.

After one or more user preferences are stored, any number of the stored preferences 110 can be used to select or reject content 124 from among a plurality of content offerings 126. Further, one or more stored user preferences can be modified based on further user activity, and the modified user preferences can then be stored in the user preference storage module (typically, but not necessarily, replacing the stored preferences they have modified). This feature allows stored preferences to change over time, and to reflect the changing taste of a single user, or different tastes of different users.

The acquisition of content offerings can be assisted by a content reception module 130 coupled to the selection module 108, which converts preference data presented along with the content into associated user preferences. Examples of such conversion operation include extracting playback time for songs on a CD, or determining the genre of performances by searching a title database for the title of a particular content offering. Thus, a user 118 who never listens to the same song for more than five minutes at a time might have a "playback time" preference of less than five minutes stored in the database 120. Another user 118 who only listens to opera recordings might have a user preference which operates to reject content 132 which includes rock and roll music.

While the apparatus 100 can be included in any number of devices, many of the anticipated uses will have only a minimal user display interface. Thus, the ability to actively manipulate the user preferences 110 in any extensive manner using the device which houses the apparatus 100 will probably be limited. However, a user preference transmission module 134 can be coupled to the user preference storage module 104, so that acquired and/or stored preferences can be sent to another location, perhaps using a wireless interface 136.

Figure 2:
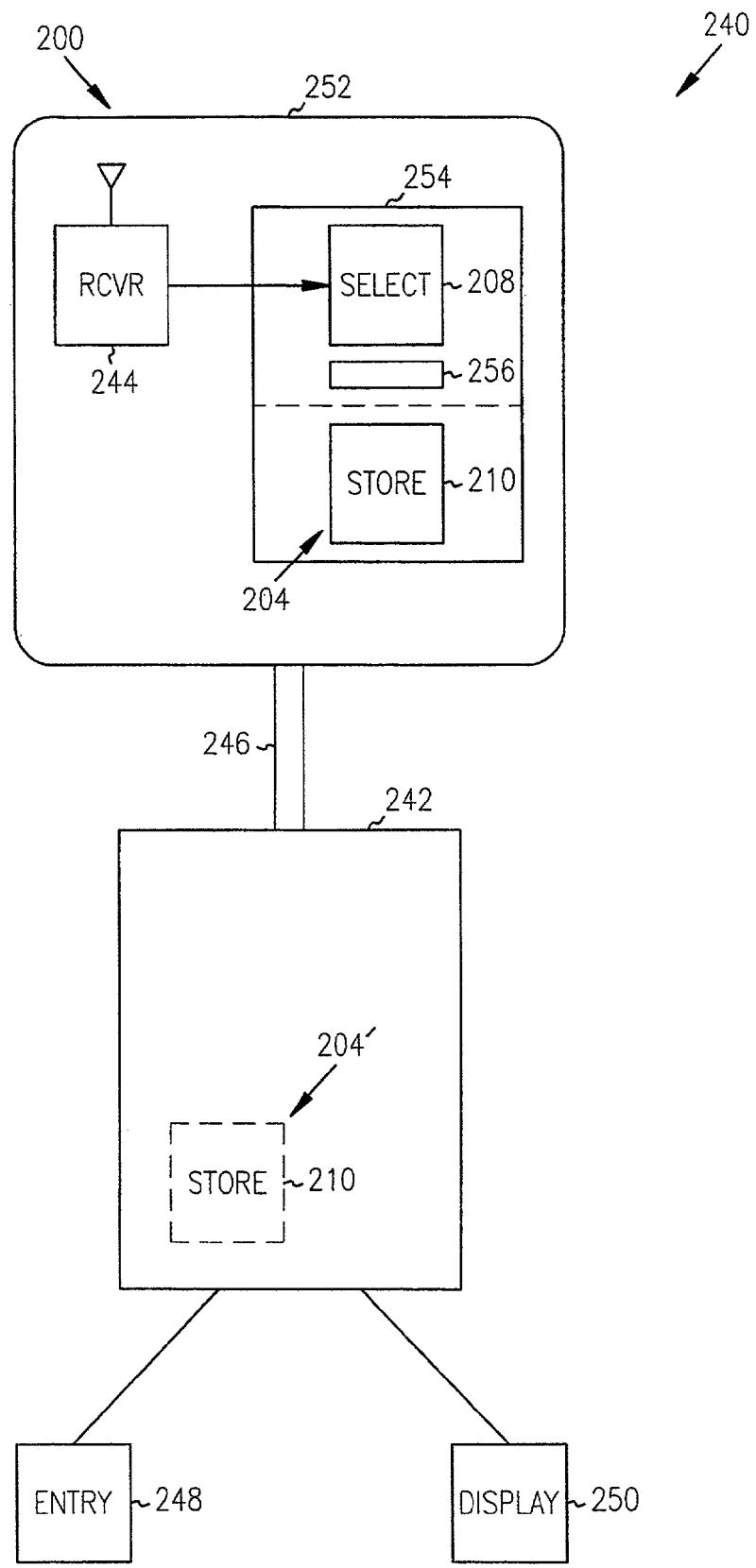
FIG. 2 is a block diagram of an article including a machine-accessible medium, and a system according to various embodiments of the present invention.

FIG. 2 is a block diagram of an article including a machine-accessible medium, and a system according to various embodiments of the present invention. The system 240 includes a media presentation apparatus 200, similar to or identical to the apparatus 100 illustrated in FIG. 1, coupled to a preference manipulation apparatus 242. For example, the media presentation apparatus can include a user preference storage module 204 communicatively coupled to a content selection module 208. As noted above, the user preference storage module 204 is used to store one or more user preferences 210 associated with user activities and content selections. The content selection module 208 is used to select content offerings based on acquired and/or stored user preferences (i.e., after they are recalled from the user preference storage module 204, and/or received using a media receiver 244, which can be a wireless radio receiver, for example).

The preference manipulation apparatus 242 can be a computer, such as a personal digital assistant (PDA), or included as part of a computer, for example, and is used primarily to maintain one or more sets of user preferences on behalf of one or more users, that is, to recover user preferences from the user preference display module 204, present them (e.g. by visual, aural, or tactile means), alter them, and restore them to the user preference storage module 204.

Several different mechanisms can be used to communicate user preferences 210 to and from the preference manipulation apparatus 242. For example, user preferences 210 can be transmitted from the user preference storage module 204 to the preference manipulation apparatus 242 (and received at the user preference storage module 204 from the preference manipulation apparatus 242) using any type of communications interface medium 246, including wired, wireless, radio-frequency, infra-red, or any other media capable of communicating digital or analog data. User preferences 210 can also be communicated between the preference manipulation apparatus 242 and the user preference storage module 204 using a removable, portable version of the user preference storage module 204', such as a floppy disc, a CD-ROM, a memory stick, etc. Finally, the preference manipulation apparatus 242 can be used to receive new user preferences, or to process user preference modification data, as presented by a preference entry module 248 communicatively coupled to the preference manipulation apparatus 242. The preference entry module 248 can be a keyboard, a software program module, or any other device or mechanism capable of entering and/or changing the user preferences communicated to the preference manipulation apparatus 242. To view the user preferences 210 communicated to the preference manipulation apparatus 242, a preference display module 250 is used. The preference display module 250 can include a television monitor or other type of device, including a speaker or other aural aid capable of communicating user preferences to a user of the preference manipulation apparatus 242.

It should be noted that the presentation apparatus 100, 200; the device 102; the user preference storage modules 104, 204, 204'; content selection modules 108, 208; acquisition module 128; content reception module 130; manipulation apparatus 242; media receiver 244; entry module 248; and display module 250 can all be characterized as "modules" herein. Such modules may include hardware circuitry, such as a microprocessor and/or memory circuits, software program modules, and/or firmware, and combinations thereof, as desired by the architect of the apparatus 100, 200, the media recording and/or playback device 102, and the system 240, and appropriate for particular implementations of various embodiments of the invention.

One of ordinary skill in the art will understand that the apparatus and systems of the present invention can be used in applications other than for devices such as mobile satellite radio receivers and PVRs, and systems which include computers and PDAs, and thus, embodiments of the invention are not to be so limited. The illustrations of apparatus 100, 200, a recording and/or playback device 102; and a system 240 are intended to provide a general understanding of the structure of embodiments of the present invention, and are not intended to serve as a complete description of all the elements and features of audio-video content processing apparatus and systems which might make use of the structures described herein.

Applications which include the novel apparatus and systems of embodiments of the present invention include electronic circuitry used in high-speed computers, communication and signal processing circuitry, modems, processor modules, embedded processors, and application-specific modules, including multilayer, multi-chip modules. Such apparatus and systems may further be included as subcomponents within a variety of electronic systems, such as televisions, cellular telephones, personal computers, entertainment centers, vehicles, and others.

Figure 3:
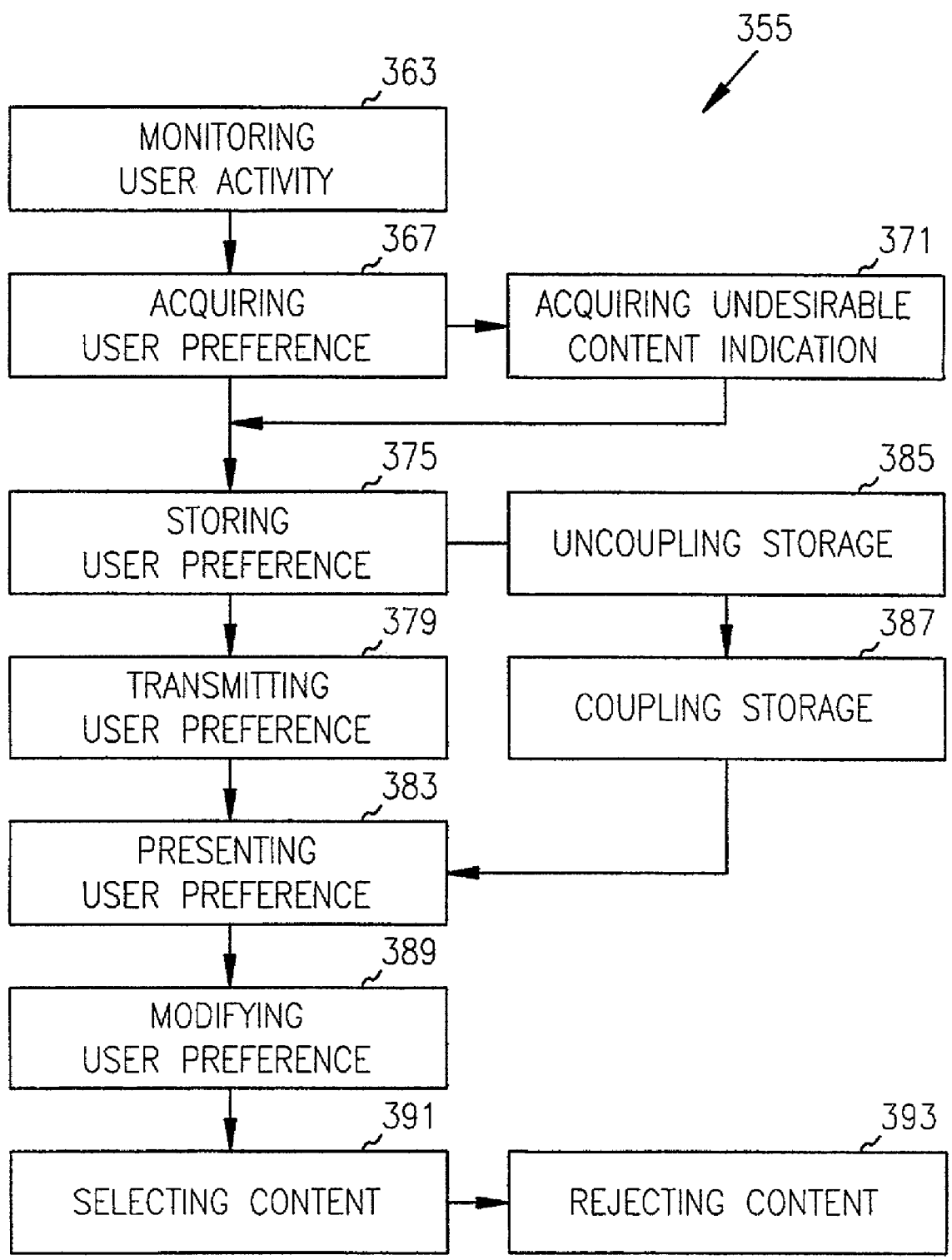
FIG. 3 is flow chart illustrating a method of processing user media content presentation preferences according to an embodiment of the present invention.

Any number of methods can be included in various embodiments of the invention. For example, FIG. 3 is flow chart illustrating a method of processing user media content presentation preferences according to an embodiment of the present invention. The method 355 may begin with monitoring various user activities, specified by the user and/or the manufacturer of various embodiments of the invention, at block 363.

The method 355 continues with acquiring one or more user preferences at block 367, such as by receiving preferences broadcast along with content offerings, or by receiving the preferences recorded in association with content offerings, and embedded within themselves, or saved apart from the selection, in a separate media file. Those skilled in the art will realize that preferences can also be derived from user activities. Thus, acquiring the user preference at block 367 may also include acquiring indications of both desirable and undesirable content offerings at block 371, such as noting that a user plays some music tracks on a particular CD (i.e., indicating desirable content selections), and skips other tracks (i.e., indicating undesirable content selections), and storing the user preferences derived from the indications of desirable and undesirable content selections at block 375.

As noted previously, user preferences can include, but are certainly not limited to: a genre, an author, a performer, a company, a media type, a rating, a publication date, and a playback time. Acquiring user preferences at block 367, and storing the preferences at block 375 can be repeated any number of times.

As noted briefly above, the user preferences can be transmitted to a preference manipulation apparatus at block 379, such as by using a wireless network, and then presented (e.g. displayed) and viewed, or otherwise perceived by a user (e.g. by way of aural or tactile presentation) at block 383.

After user preferences are stored at block 375, the preferences can also be communicated to the preference manipulation apparatus by uncoupling some type of storage medium (where the user preferences are stored, or copied) from the media presentation apparatus at block 385, and then coupling the storage medium to the preference manipulation apparatus at block 387. At this point, the preferences are presented to the user (e.g. displayed and viewed) at block 383.

Those skilled in the art will realize that the user preferences can be presented to the user at the media presentation device (although typically in a limited form) and/or at the preference manipulation apparatus. Preferences can also be modified at the media presentation device (again, typically in a somewhat limited fashion) and/or at the preference manipulation apparatus at block 389. For example, if preferences are recorded at a satellite radio receiver, the radio receiver display can be used to present some subset of stored preferences to a user for modification, such as when user activities are misinterpreted, or when a different user wishes to operate the receiver. Pushbuttons or keys on the receiver can be used to change the stored preferences and/or activities which are monitored in conjunction with acquiring and storing preferences. Those skilled in the art will also realize that the mechanism used to enable automatic content selection can be designed so that it can be disabled at any time, as desired by the manufacturer of equipment implementing various embodiments of the invention, and/or various users.

One or more content offerings based on the user preferences are automatically selected at block 391. Content offerings, typically selected from a plurality of offerings (e.g. a television show selected from several hundred channels of programming) can be selected on the basis of a single user preference, on the number of times a particular preference has been stored, or using some combination of preferences which interact with each other. For example, the user activities of skipping over content which includes sporting events, and viewing/listening to such content for very limited time periods can be combined to weight the automatic selection process heavily in favor of avoiding such content, and thus rejecting the selection of such content at block 393. Of course, newly-acquired and/or stored preferences can also be combined with previously-stored preferences to affect the selection process, resulting in the automated selection of content at block 391, and/or the rejection of content at block 393. In other words, the method also includes monitoring further user activity, modifying one or more stored user preferences based on the monitored activity (which provides one or more new user preferences), and then storing the new user preferences.

Referring back to FIG. 2, it is now easily understood that another embodiment of the invention includes an article 252, such as a computer, a memory system, a magnetic or optical disk, some other storage device, and/or any type of electronic device or system, comprising a machine-accessible medium 254 (e.g., a memory including an electrical, optical, or electromagnetic conductor) having data 256 (e.g. computer program instructions), which when accessed, results in a machine performing such actions as monitoring user activity, obtaining one or more user preferences associated with the user activity and a content selection, and selecting a content offering from among a plurality of content offerings based on the user preference. Other actions performed by the machine might include, for example, rejecting a content offering included as part of a plurality of content offerings based on an indication of undesirable content, transmitting the user preference to a preference manipulation apparatus using a wireless network, and displaying the user preference.

The apparatus, systems, articles, and methods of the invention provide an efficient mechanism whereby various types of media content, received in either analog or digital form, can be selected in an automated fashion based on user preferences. Such preferences are typically stored based on monitored user activities in relation to content selections, including selections which have been made in an automated fashion as described herein. Thus, various embodiments of the invention provide convenient automatic selection of any number of media content types based on user preferences, enabling users to easily and quickly access content which is likely to please them from among numerous available offerings. The ability to easily store, modify, and transfer user preferences with respect to various media content will enable users to enjoy such content, such as recorded television, wherever portable devices can be operated, increasing the potential size of viewing audiences and perhaps serving as an additional source of licensing revenue for content providers.

Although specific embodiments have been illustrated and described herein, those of ordinary skill in the art will appreciate that any arrangement which is calculated to achieve the same purpose can be substituted for the specific embodiments shown. This disclosure is intended to cover any and all adaptations or variations of various embodiments of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. A system comprising:

an audio/video media presentation apparatus configured to present audio/video content, a user preference storage module configured to:
  monitor the user's activities for an indication of user preferences for audio/video content offerings, where said activities that are monitored include at least one of:
    listening to audio content and monitoring the time duration for each particular audio content and monitoring a volume level in comparison to a normal listening level for each particular audio content as it is listened to; and
    viewing video content and monitoring the time duration for each particular video content and monitoring a volume level in comparison to a normal listening level for each particular video content as it is viewed;
  determine, based upon said monitoring of the at least one of listening and viewing, the user preferences; and
  store said user preferences indicated by said monitored activities; and a content selection module communicatively coupled to the user preference storage module, the content selection module being configured to automatically select, without user intervention, an audio/video content offering from among a plurality of audio/video content offerings in response to the presentation of said plurality of audio/video content offerings to said user, said selection being based on the stored user preferences;

wherein the user preference storage module and the content selection module are integrated into the audio/video media presentation apparatus such that said user preferences are stored on said audio/video media presentation apparatus.

2. The system of claim 1, further comprising:
a user preference transmission module, communicatively coupled to the user preference storage module, for transmitting the stored user preferences so as to permit editing of the stored user preferences.

3. The system of claim 1, wherein the user preference is modified based on further user activity, and wherein a modified user preference is stored in the user preference storage module.

4. The system of claim 1, further comprising:
a removable storage device, removably coupled to the user preference storage module so as to form part thereof, for storing said user preferences, and for enabling removal of said stored user preferences for editing, and return of edited user preferences to said user preference storage module.

5. The system of claim 1, further comprising:
a database included in the user preference storage module, the database including a plurality of stored user preferences; and
wherein the system further includes each of the following:
monitoring the user activity of the user refraining from changing the particular audio/video content until after the particular audio/video content has ended and noting the particular audio/video content as being more desirable in said user preferences;
monitoring the user activity of the user viewing or listening to the particular audio/video content selection for less than one minute and noting the particular audio/video content as being less desirable in said user preferences;
monitoring the user activity of the user skipping a selected audio/video content completely when a plurality of audio/video content are offered in a sequential format and noting the skipped audio/video content as being less desirable in said user preferences; and
monitoring the user activity of the user viewing a plurality of titles of audio/video content and failing to select any particular audio/video content from the titles that are viewed and noting the titles that were viewed as being less desirable in said user preferences.

6. The system of claim 5, wherein each one of the plurality of stored user preferences is selected from a group including a genre, an author, a performer, a company, a rating, a publication date, and a playback time.

7. The system of claim 1, further comprising:
a user preference acquisition module to acquire the user preference, the user preference acquisition module communicatively coupled to the user preference storage module.

8. The system of claim 1, further comprising:
a content reception module, coupled to the content selection module, for converting preference data presented along with the audio/video content into associated user preferences.

9. The system of claim 1 wherein the user preference storage module and the content selection module are integrated into a same housing as the audio/video media presentation apparatus.

10. The system of claim 1 wherein the audio/video media presentation apparatus is configured to playback audio/video content recorded on a media item.

11. A system, comprising:
an audio/video media presentation apparatus for automated selection of audio/video media content for presentation to a user, said apparatus including:
a user preference storage module configured to monitor user activities of at least one of listening to audio content and monitoring the time duration for each particular audio content and monitoring a volume level in comparison to a normal listening level for each particular audio content as it is listened to; and
viewing video content and monitoring the time duration for each particular video content and monitoring a volume level in comparison to a normal listening level for each particular video content as it is viewed;
for an indication of the user's preferences for audio/video content offerings, determine the user preferences based upon said monitoring of the at least one of listening and viewing, and store user preferences when the user activities indicates preferences for audio/video content offerings; and
a content selection module communicatively coupled to the user preference storage module, the content selection module configured to recall the stored user preferences and automatically select, without user intervention, an audio/video content offering for the user, based upon the stored user preferences, from among a plurality of audio/video content offerings in response to the presentation of said plurality of audio/video content offerings to said user, said selection being based on the stored user preferences;
wherein the user preference storage module and the content selection module are integrated into the audio/video media presentation apparatus such that said user preferences are stored on said audio/video media presentation apparatus; and
a preference manipulation apparatus, communicatively coupled to the media presentation apparatus, configured to:
recover user preferences from the user preference storage module;
present the user preferences to the user for manipulation;
alter the user preferences in response to manipulation by the user; and
restore the user preferences to the user preference storage module.

12. The system of claim 11, wherein the audio/video media presentation apparatus includes a wireless media receiver communicatively coupled to the content selection module.

13. The system of claim 11, wherein the preference manipulation apparatus is a computer.

14. The system of claim 11, wherein the system further comprises:
a preference entry module, communicatively coupled to the preference manipulation apparatus, for editing the user preferences communicated to the preference manipulation apparatus.

15. The system of claim 11, wherein the system further comprises:
a preference display module, communicatively coupled to the preference manipulation apparatus, for communicating, the user preferences to a user of the preference manipulation apparatus.

16. The system of claim 11 wherein the user preference storage module and the content selection module are integrated into a same housing as the audio/video media presentation apparatus.

17. A method of automated selection of an audio/video content offering from among a plurality of content offerings, comprising:
- monitoring a user's activity for an indication of a user preference for an audio/video content offering, said activities that are monitored including at least one of:
  - listening to audio content monitoring the time duration for each particular audio content and monitoring a volume level in comparison to a normal listening level for each particular audio content as it is listened to; and
  - viewing video content and monitoring the time duration for each particular video content and monitoring a volume level in comparison to a normal listening level for each particular video content as it is viewed;
- determining based upon said monitoring of the at least one of listening and viewing, the user preference;
- storing said user preference in a user preference storage module that is integrated in an audio/video presentation apparatus;
- selecting, without any user intervention, an audio/video content offering from among a plurality of audio/video content offerings in response to the presentation by said audio/video presentation apparatus of said plurality of audio/video content offerings to said user, said selection being based on the stored user preference;
- uncoupling a storage medium from said presentation apparatus, the storage medium including the user preference;
- coupling the storage medium to a preference manipulation apparatus; and
- viewing the user preference.

18. The method of claim 17, further comprising:
acquiring the user preference; and
wherein the monitoring of the user's activities further includes at least one of:
- monitoring the user activity of the user refraining from changing the particular audio/video content until after the particular audio/video content has ended and noting the particular audio/video content as being more desirable in said user preference;
- monitoring the user activity of the user viewing or listening to the particular audio/video content selection for less than one minute and noting the particular audio/video content as being less desirable in said user preference;
- monitoring the user activity of the user skipping a selected audio/video content completely when a plurality of audio/video content are offered in a sequential format and noting the skipped audio/video content as being less desirable in said user preference; and
- monitoring the user activity of the user viewing a plurality of titles of audio/video content and failing to select any particular audio/video content from the titles that are viewed and noting the titles that were viewed as being less desirable in said user preference.

19. The method of claim 18, further comprising repeatedly acquiring the user preference, and wherein the step of selecting an audio/video content offering based on the stored user preference further comprises selecting the content offering based on a number of times the user preference has been acquired.

20. The method of claim 17, wherein the user preference is selected from a plurality of user preferences including a genre, an author, a performer, a company, a rating, a publication date, and a playback time.

21. The method of claim 17, wherein the user activity includes an indication of undesirable content, further comprising:
- monitoring the user activity; and
- storing the user preference based on the indication of undesirable content.

22. The method of claim 17, further comprising:
- monitoring further user activity;
- modifying the user preference based on the further user activity to provide a new user preference; and
- storing the new user preference.

23. The method of claim 17, wherein the step of selecting an audio/video content offering based on the stored user preference further comprises:
- selecting the audio/video content offering from among a plurality of audio/video content offerings based on a plurality of stored user preferences including the user preference.

* * * * *